US00RE44343E

(19) United States
(12) Reissued Patent
Fuerstenau et al.

(10) Patent Number: US RE44,343 E
(45) Date of Reissued Patent: Jul. 9, 2013

(54) FLUX CORED PREFORMS FOR BRAZING

(75) Inventors: Charles E. Fuerstenau, Greenville, WI (US); Alan Belohlav, Belgium, WI (US)

(73) Assignee: Lucas-Milhaupt, Inc., Cudahy, WI (US)

(21) Appl. No.: 12/834,506

(22) Filed: Jul. 12, 2010

Related U.S. Patent Documents

Reissue of:
(64) Patent No.: 6,830,632
Issued: Dec. 14, 2004
Appl. No.: 10/202,148
Filed: Jul. 24, 2002

U.S. Applications:
(62) Division of application No. 11/639,356, filed on Dec. 14, 2006, now Pat. No. Re. 42,329.

(51) Int. Cl.
*B23K 35/34* (2006.01)

(52) U.S. Cl.
USPC ..... 148/23

(58) Field of Classification Search
USPC ..... 419/66; 148/23, 24
See application file for complete search history.

(56) References Cited

U.S. PATENT DOCUMENTS

| | | | |
|---|---|---|---|
| 400,869 | A | 4/1889 | Norton et al. |
| 607,504 | A | 7/1898 | Crowther |
| 1,650,905 | A | 12/1925 | Mills |
| 1,629,748 | A | 5/1927 | Stoody |
| 1,865,169 | A | 7/1927 | Candy |
| 1,968,618 | A | 2/1932 | Padgett et al. |
| 1,972,315 | A | 9/1934 | Ramey |
| 2,005,189 | A | 6/1935 | Herr |
| 2,055,276 | A | 9/1936 | Brownsdon et al. |
| 2,279,284 | A | 4/1942 | Wasserman |
| 2,442,087 | A | 3/1945 | Kennedy |
| 2,465,503 | A | 10/1947 | Woods |
| 2,499,641 | A | 3/1950 | Goody |
| 2,565,477 | A | 8/1951 | Crowell et al. |
| 2,785,285 | A | 3/1953 | Bernard |

(Continued)

FOREIGN PATENT DOCUMENTS

| | | |
|---|---|---|
| AU | 4936179 | 7/1980 |
| BE | 878006 | 1/1980 |

(Continued)

OTHER PUBLICATIONS

International Search Report dated Dec. 21, 2007; PCT/US06/043856 filed Nov. 9, 2006.

(Continued)

*Primary Examiner* — Weiping Zhu
(74) *Attorney, Agent, or Firm* — Boyle Fredrickson, S.C.

(57) ABSTRACT

A wire preform suitable for use in brazing components to one another. The preform is made from a length of wire having a core of flux material, and a longitudinal seam or gap that extends over the length of the wire. The seam is formed so that when heated, the flux material flows from the core and out of the seam. The length of wire is in the form of a loop having a certain circumference so that when the preform is heated, the flux material disperses uniformly from the circumference of the preform for evenly treating the surface of a component on which the preform is placed. The length of wire may include a silver alloy.

22 Claims, 3 Drawing Sheets

U.S. PATENT DOCUMENTS

| | | | | |
|---|---|---|---|---|
| 2,927,043 | A | | 3/1960 | Stetson |
| 2,958,941 | A | | 11/1960 | Goerg |
| 3,033,713 | A | | 5/1962 | Bielenberg et al. |
| 3,051,822 | A | | 8/1962 | Bernard et al. |
| 3,077,131 | A | | 2/1963 | McShane |
| 3,162,551 | A | | 12/1964 | Short |
| 3,198,560 | A | | 8/1965 | Collins |
| 3,239,125 | A | | 3/1966 | Sherlock |
| 3,245,141 | A | | 4/1966 | Gruetjen |
| 3,290,772 | A | | 12/1966 | Crouch |
| 3,318,729 | A | | 5/1967 | Siegle et al. |
| 3,365,565 | A | | 1/1968 | Claussen |
| 3,452,419 | A | | 7/1969 | Hillert |
| 3,534,390 | A | | 10/1970 | Woods et al. |
| 3,542,998 | A | | 11/1970 | Huff |
| 3,555,240 | A | | 1/1971 | Gloor et al. |
| 3,558,851 | A | | 1/1971 | Oku |
| 3,610,663 | A | | 10/1971 | Lago |
| 3,619,429 | A | | 11/1971 | Torigai et al. |
| 3,620,830 | A | | 11/1971 | Kramer |
| 3,620,869 | A | | 11/1971 | Stump et al. |
| 3,639,721 | A | | 2/1972 | Hubbel |
| 3,642,998 | A | | 2/1972 | Jennings |
| 3,688,967 | A | | 9/1972 | Arikawa et al. |
| 3,695,795 | A | | 10/1972 | Jossick |
| 3,703,254 | A | | 11/1972 | Maierson et al. |
| 3,745,644 | A | | 7/1973 | Moyer et al. |
| 3,935,414 | A | | 1/1976 | Ballass et al. |
| 3,967,036 | A | | 6/1976 | Sadowski |
| 3,980,859 | A | | 9/1976 | Leonard |
| 4,041,274 | A | | 8/1977 | Sadowski |
| 4,121,750 | A | | 10/1978 | Schoer et al. |
| 4,134,196 | A | | 1/1979 | Yamaji et al. |
| 4,174,962 | A | | 11/1979 | Frantzreb, Sr. et al. |
| 4,214,145 | A | | 7/1980 | Zvanut et al. |
| 4,301,211 | A | | 11/1981 | Sloboda |
| 4,379,811 | A | | 4/1983 | Puschner et al. |
| 4,396,822 | A | | 8/1983 | Kishida et al. |
| 4,430,122 | A | | 2/1984 | Pauga |
| 4,447,472 | A | | 5/1984 | Minnick et al. |
| 4,493,738 | A | | 1/1985 | Collier et al. |
| 4,497,849 | A | | 2/1985 | Hughes et al. |
| 4,571,352 | A | | 2/1986 | Aoki |
| 4,587,097 | A | | 5/1986 | Rabinkin et al. |
| 4,587,726 | A | | 5/1986 | Holmgren |
| 4,624,860 | A | | 11/1986 | Alber et al. |
| 4,708,897 | A | | 11/1987 | Douchy |
| 4,762,674 | A | | 8/1988 | Cheng et al. |
| 4,785,092 | A | | 11/1988 | Nanba et al. |
| 4,800,131 | A | | 1/1989 | Marshall et al. |
| 4,831,701 | A | | 5/1989 | Yutaka |
| 4,900,895 | A | | 2/1990 | Marshall |
| 4,901,909 | A | | 2/1990 | George |
| 4,993,054 | A | | 2/1991 | Ujari |
| 5,098,010 | A | | 3/1992 | Carmichael et al. |
| 5,175,411 | A | | 12/1992 | Barber |
| 5,184,767 | A | | 2/1993 | Estes |
| 5,280,971 | A | | 1/1994 | Tokutake et al. |
| 5,316,206 | A | | 5/1994 | Syslak et al. |
| 5,360,158 | A | | 11/1994 | Conn et al. |
| 5,418,072 | A | | 5/1995 | Baldantoni et al. |
| 5,575,933 | A | | 11/1996 | Ni |
| 5,749,971 | A | | 5/1998 | Ni |
| 5,759,707 | A | | 6/1998 | Belt et al. |
| 5,781,846 | A | * | 7/1998 | Jossick ..... 419/66 |
| 5,791,005 | A | | 8/1998 | Grabowski et al. |
| 5,806,752 | A | | 9/1998 | Van Evans et al. |
| 5,820,939 | A | | 10/1998 | Popoola et al. |
| 5,903,814 | A | | 5/1999 | Miura et al. |
| 5,917,141 | A | | 6/1999 | Naquin |
| 6,093,761 | A | | 7/2000 | Schofalvi |
| 6,204,316 | B1 | | 3/2001 | Schofalvi |
| 6,244,397 | B1 | | 6/2001 | Kars |
| 6,248,860 | B1 | | 6/2001 | Sant'Angelo et al. |
| 6,264,062 | B1 | | 7/2001 | Lack et al. |
| 6,277,210 | B1 | | 8/2001 | Schuster |
| 6,317,913 | B1 | | 11/2001 | Kilmer et al. |
| 6,344,237 | B1 | | 2/2002 | Kilmer et al. |
| 6,376,585 | B1 | | 4/2002 | Schofalvi et al. |
| 6,395,223 | B1 | | 5/2002 | Schuster et al. |
| 6,409,074 | B1 | | 6/2002 | Katoh et al. |
| 6,417,489 | B1 | | 7/2002 | Blankenship et al. |
| 6,426,483 | B1 | | 7/2002 | Blankenship et al. |
| 6,432,221 | B1 | | 8/2002 | Seseke-Koyro et al. |
| 6,497,770 | B2 | | 12/2002 | Watsuji et al. |
| 6,680,359 | B2 | | 1/2004 | Schoenheider |
| 6,713,593 | B2 | | 3/2004 | Ree et al. |
| 6,733,598 | B2 | | 5/2004 | Swidersky et al. |
| 6,830,632 | B1 | | 12/2004 | Fuerstenau et al. |
| 6,846,862 | B2 | | 1/2005 | Schofalvi et al. |
| 6,864,346 | B2 | | 3/2005 | Schoenheider |
| 6,881,278 | B2 | | 4/2005 | Amita et al. |
| 7,337,941 | B2 | | 3/2008 | Scott et al. |
| 7,442,877 | B2 | | 10/2008 | Kmata et al. |
| 2002/0005230 | A1 | | 1/2002 | Watsuji et al. |
| 2003/0203137 | A1 | | 10/2003 | Teshima et al. |
| 2004/0009358 | A1 | | 1/2004 | Scott et al. |
| 2004/0171721 | A1 | | 9/2004 | Esemplare |
| 2005/0129855 | A1 | | 6/2005 | Kamata et al. |
| 2009/0077736 | A1 | | 3/2009 | Loberger et al. |
| 2011/0023319 | A1 | | 2/2011 | Fukaya et al. |

FOREIGN PATENT DOCUMENTS

| | | |
|---|---|---|
| CA | 1146025 | 5/1983 |
| CA | 1303605 | 6/1992 |
| DE | 2931040 | 2/1980 |
| DE | 60120250 | 4/2007 |
| DK | 323379 | 2/1980 |
| EP | 0991697 | 4/2000 |
| EP | 1127653 | 8/2001 |
| ES | 483021 | 4/1980 |
| FR | 7812546 | 11/1977 |
| FR | 2432360 | 2/1980 |
| GB | 692710 | 6/1953 |
| GB | 1180735 | 2/1970 |
| GB | 1481140 | 7/1977 |
| GB | 2027617 | 2/1980 |
| IE | 48459 | 1/1985 |
| IN | 152853 | 4/1984 |
| IT | 1193704 | 8/1988 |
| JP | 55045591 | 3/1980 |
| JP | 62034698 | 2/1987 |
| JP | 63040697 | 2/1988 |
| JP | 63303694 | 12/1988 |
| JP | 1066093 | 3/1989 |
| JP | 2179384 | 7/1990 |
| JP | 3005094 | 1/1991 |
| JP | H3-5094 | 1/1991 |
| JP | 3204169 | 9/1991 |
| JP | 4371392 | 12/1992 |
| JP | 6007987 | 1/1994 |
| JP | 11347783 | 12/1999 |
| JP | 2002512655 | 4/2002 |
| NL | 7905877 | 2/1980 |
| NO | 792504 | 2/1980 |
| SE | 7906495 | 2/1980 |
| WO | WO99/00444 | 1/1999 |
| WO | WO9900444 | 1/1999 |
| WO | WO00/39172 | 7/2000 |
| WO | WO00/52228 | 9/2000 |
| WO | WO00/64626 | 11/2000 |
| WO | WO02/00569 | 1/2002 |
| WO | WO02/31023 | 4/2002 |
| WO | WO03/068447 | 8/2003 |
| WO | WO03/089176 | 10/2003 |
| ZA | 7903893 | 7/1980 |

OTHER PUBLICATIONS

Written Opinion of the ISA dated May 10, 2008.; PCT/US06/043856 filed Nov. 9, 2006.

International Preliminary Report on Patentability dated May 14, 2008; PCT/US06/043856 filed Nov. 9, 2006.

International Search Report dated Dec. 4, 2008; PCT/US08/064871 filed May 27, 2008.

Written Opinion of the ISA dated Nov. 25, 2009; PCT/US08/064871 filed May 27, 2008.

International Preliminary Report dated Dec. 1, 2009; PCT/US08/064871 filed May 27, 2008.
International Search Report dated Apr. 9, 2008; PCT/US07/025309 filed Dec. 11, 2007.
Written Opinion of the ISA dated Jun. 11, 2009; PCT/US07/025309 filed Dec. 11, 2007.
International Preliminary Report dated Jun. 16, 2009; PCT/US07/025309 filed Dec. 11, 2007.
Belohlav, "Understanding Brazing Fundamentals," The American Welder; Sep.-Oct. 2000; Jul. 11, 2008; <http://www.aws.org/wyamwelder/9-00/fundamentals.html>.
International Search Report dated Nov. 8, 2007; PCT/US07/069636 filed May 24, 2007.
Written Opinion of the ISA dated Nov. 8, 2007; PCT/US07/069636 filed May 24, 2007.
International Preliminary Report dated Nov. 28, 2008; PCT/US07/069636 filed May 24, 2007.
European Search Report, dated Jun. 22, 2012 for Application No. PCT/US2006043856.

* cited by examiner

FLUX CORED PREFORMS FOR BRAZING

Matter enclosed in heavy brackets [ ] appears in the original patent but forms no part of this reissue specification; matter printed in italics indicates the additions made by reissue.

*CROSS-REFERENCE(S) TO RELATED APPLICATION(S)*

*Notice: More than one reissue application has been filed for the reissue of U.S. Pat. No. 6,830,632. The present reissue application is a divisional reissue application of U.S. Ser. No. 11/639,356, now U.S. Pat. No. Re. 42,329. A continuation of this present reissue application, U.S. Ser. No. 13/010,144 has also been filed.*

FIELD OF THE INVENTION

The present invention is directed to wire preforms for use in brazing.

DISCUSSION OF THE KNOWN ART

The brazing process typically involves joining ferrous and non-ferrous metal components together by positioning a brazing composition (such as an aluminum or silver-bearing metal alloy) and a flux adjacent to or between surfaces of the components to be joined, also known as the faying surfaces. To form the joint, the metal alloy and flux and the faying surfaces are heated to a temperature typically above the melting temperature of the alloy but below the melting temperature of the components to be joined. The alloy then melts, flows into the faying surfaces by capillary action and forms a seal that bonds the faying surfaces to one another.

A flux composition is often applied to the faying surfaces prior to brazing. In one application, a flux can be selected so that, when applied, it does one or more of the following: (1) removes oxides ordinarily present on the faying surfaces; (2) promotes the flow of the molten brazing alloy when heated to a temperature above its melting point; and (3) inhibits further oxide formation on the faying surfaces.

Flux cored wire ring preforms for brazing are known to have been made using an aluminum/silicon metal alloy. When heated, the alloy tends to [men] *melt* quickly enough to allow the core flux material to disperse fairly evenly and to enable satisfactory joints to be made. A known supplier of flux cored aluminum [rin] *ring* preforms is Omni Technologies Corporation.

Initial attempts to make silver alloy flux cored braze ring preforms using the same design principles as the aluminum preforms *were* met with little initial success, however. Specifically, when the silver preforms were heated, the flux would not disperse evenly about the rings but, rather, would exit only from opposite ends of the silver wire forming the preforms before melting of the wire itself. As a result the braze joints were poor.

Accordingly, there is a need for a flux cored braze ring preform that, during heating, will disperse its core flux material evenly about the ring and onto a surface to be treated for brazing. In particular, there is a need for such preforms made of silver alloys.

SUMMARY OF THE INVENTION

The present invention is directed to a flux cored brazing preform. A metal alloy is provided as an elongated thin sheet that is rolled around its long axis so as to encase a flux material. The rolled metal alloy sheet thus forms a flux cored wire having a longitudinal seam through which the flux material, when in a molten state, can exit.

The flux cored wire is then shaped into a braze ring preform which when heated allows the encased flux material to flow uniformly from the seam about the circumference of the preform, and to disperse evenly for treating a surface to be brazed.

DETAILED DESCRIPTION OF THE INVENTION

In general, seamed flux cored brazing wires can be produced in accordance with procedures disclosed in French Patent Application no. 78 12546, published Nov. 25, 1977, and the seam area of the rolled sheet of metal may be modified as described herein. Other seamed flux cored brazing or welding wires are disclosed in, for example, U.S. Pat. No. 3,935,414 (Jan. 27, 1976); U.S. Pat. No. 1,629,748 (May 24, 19271); U.S. Pat. No. 4,379,811 (Apr. 12, 1983); U.S. Pat. No. 2,958,941 (Nov. 8, 1960); U.S. Pat. No. 4,396,822 (Aug. 2, 1983); U.S. Pat. No. 3,642,998 (Nov. 24, 1970); and Japanese Patent No. 63-303694 (Dec. 1, 1988).

Figure 1:
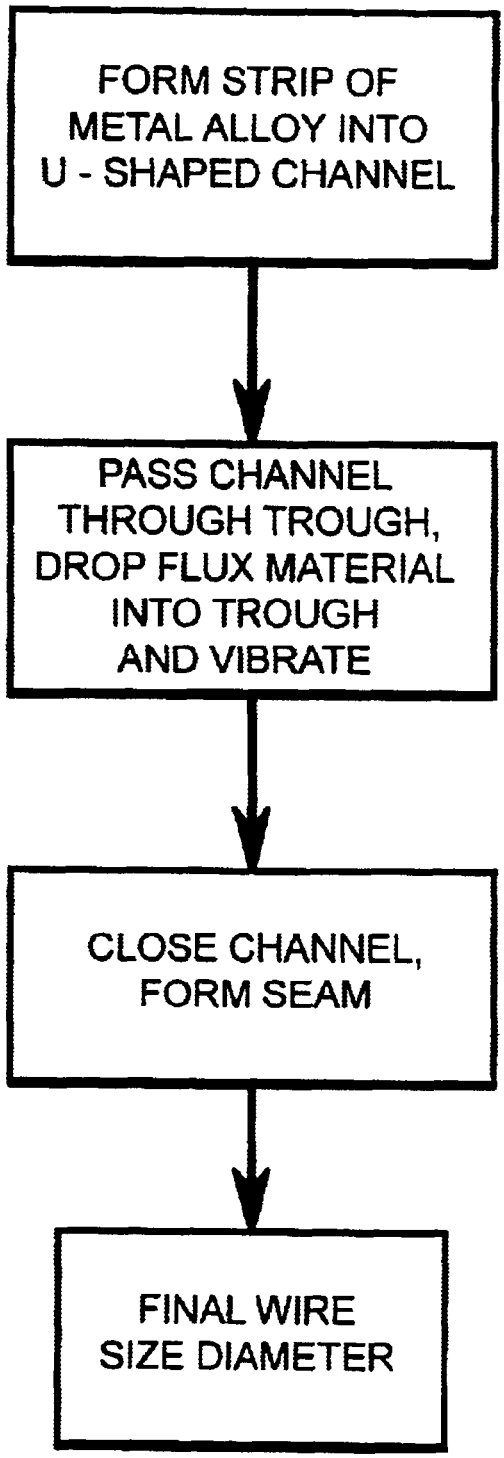
FIG. 1 is a flow chart depicting a method of producing lengths of seamed brazing wire for shaping into brazing preforms according to the invention[:] *;*

As represented in FIG. 1, a narrow [elongate] *elongated* strip of a metal alloy which may have been coiled onto a spool to facilitate the feeding thereof during the manufacturing process is formed into a [U-shape] *U-shaped* channel by a first die. The U-shaped channel is passed through a trough by pulling the strip in a direction away from the spool or other dispensing apparatus. A powdered flux material is conveyed from a dispenser so as to drop from the dispenser into a trough which contains the U-shaped channel and to over-fill the trough. A vibrating apparatus is typically employed to vibrate the trough in order to fill the strip. Optionally, lasers may be employed to ensure that the amount of flux that fills the metal alloy strip is sufficient to form an adequate brazed joint. The filled strip is passed out of the trough, [though] *through* a second die where the filled channel begins to close. The wire then passes through a third die where the wire is closed and a butt seam is formed with the opposing side edge portions of the strip.

The wire then passes through a fourth die which forces an edge portion of the seam inward, e.g., about 0.005" to 0.010". This portion is maintained to about 45 degrees or less of the circumference of the wire, and leaves a gap between the opposed edge portions of strip. The inner edge portion extends toward the center of the cored wire, and the space between the edge portions contains flux[. See] *, see* FIG. 2 [,] . It is believed that this creates a path for the flux in the center of the core to release from the core.

The wire then passes through a fifth die where the wire is formed to its final size diameter, while maintaining the seam as described above. The flux cored wire is then packaged on spools and other suitable packaging systems.

The metal alloy strip can be any of the following alloys, among others: aluminum-silicone; zinc-aluminum; copper zinc; silver-copper-zinc; silver-copper-zinc-tin; silver copper-zinc-tin-nickel; silver-copper-zinc-nickel; silver-copper-tin; silver-copper-zinc-manganese-nickel; silver-copper-zinc-cadmium; and silver-copper-zinc-cadmium and nickel.

The flux-cored brazing wire formed as described above can subsequently be formed [to] into brazing preforms having any desired shape, such as a circle or oval. The preforms can then be placed between or adjacent to faying surfaces of components to be joined. The preforms and the faying surfaces are then heated to a suitable brazing temperature sufficient to melt the flux and the brazing alloy and, thus, bond the faying surfaces. The components are then cooled to solidify the brazing alloy and to secure the bond between the faying surfaces.

Figure 2:
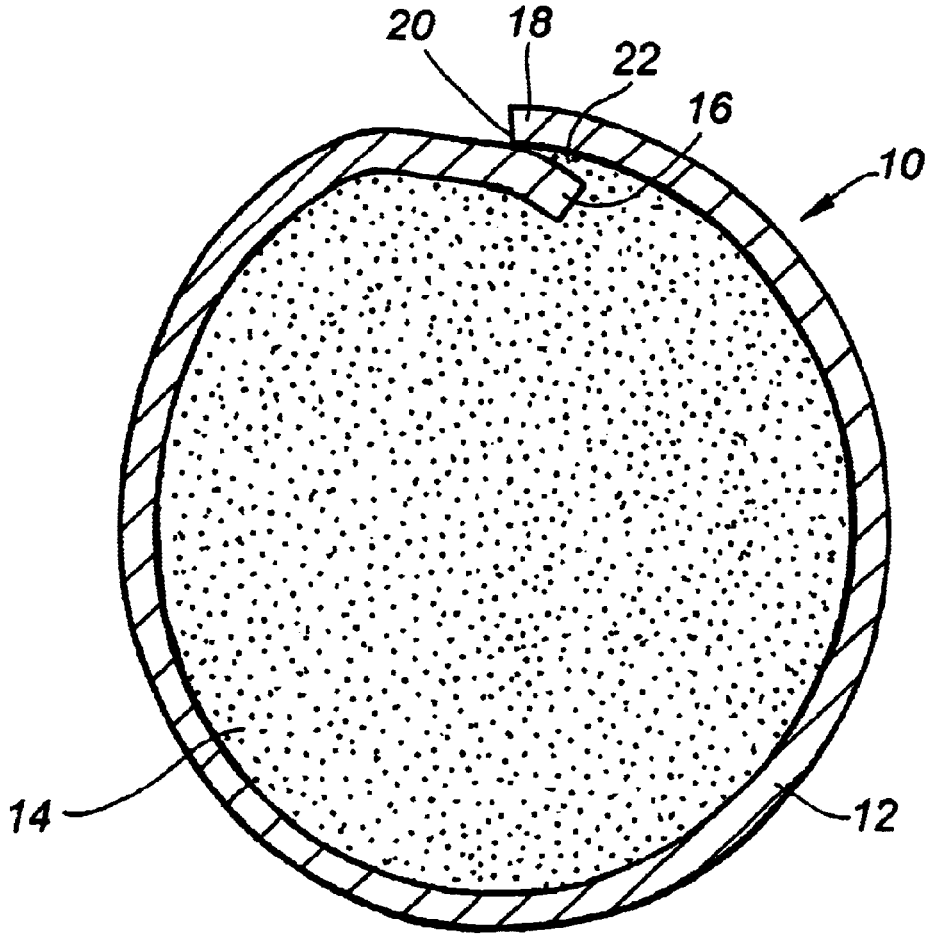
FIG. 2 is a cross sectional view of the brazing wire produced according to FIG. 1.

As shown in cross section in FIG. 2, the flux cored wire 10 includes the rolled metal alloy sheet 12 that defines an encasing perimeter that extends around the flux material 14 of the core. An inner angled edge portion 16 of the sheet 12 is embedded in the flux material 14. Moving counter-clockwise in FIG. 2, the inner angled edge portion 16 of the sheet 12 emerges from the core and the sheet 12 extends around the flux material, and an outer edge portion 18 of the sheet 12 confronts the sheet 12 in the vicinity of the location where inner angled edge portion 16 of the sheet 12 emerges from the core, thereby forming a seam 20. Between the inner angled edge portion 16 and the outer edge portion of the sheet, there is a gap 22, in which a portion of the flux material 14 resides. Also, the inner angled edge portion 16 is surrounded by flux material.

The metal alloy strip 12 may be formed or bowed into a brazing wire having a cross section of any desired shape and size. For example, the strip 12 may be rolled about its longitudinal axis in a substantially circular manner to form the wire 10 in FIG. 2. Once rolled, a length of the wire may be shaped, twisted or molded into various shapes, for example, adopting a configuration that is complementary to the various angles and sizes of the surfaces to be brazed. In specific embodiments, as illustrated in FIGS. 3 to 5, the wire can be formed into braze rings or helical loops having a circular cross-section, and further having a wire diameter between about 0.031 and 0.125 inches.

As mentioned, the seamed, flux cored brazing wire 10 may be manufactured by other techniques that are known in the art. For example, roll forming technology, alone and in combination with dies, can be employed to produce a cored wire. The cored wires may also be produced with a gap to allow flux dispersion from the seam.

Cored wire with a butt seam may also be produced, and due to other factors (like an oval, square or other shape of preforms made from the wire) the flux will be allowed to escape from the seam during brazing.

Figure 3:
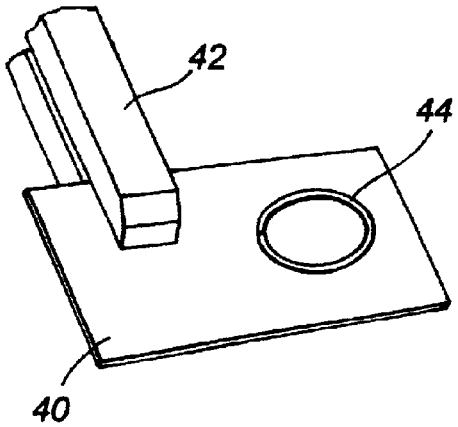
FIGS. 3 to 5 show brazing preforms according to the invention.
Figure 4:
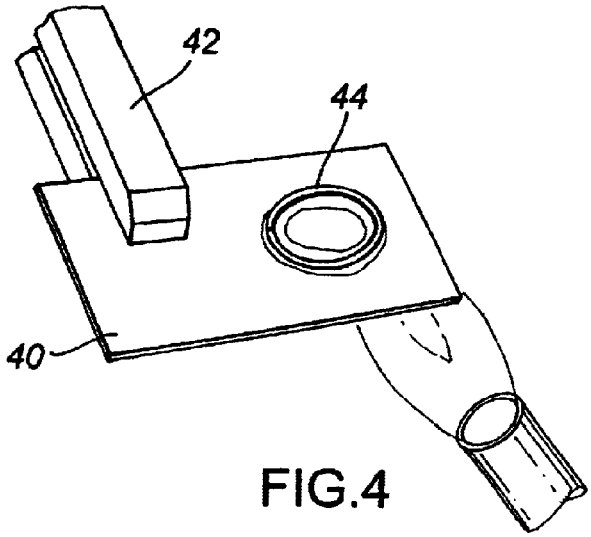
Figure 5:
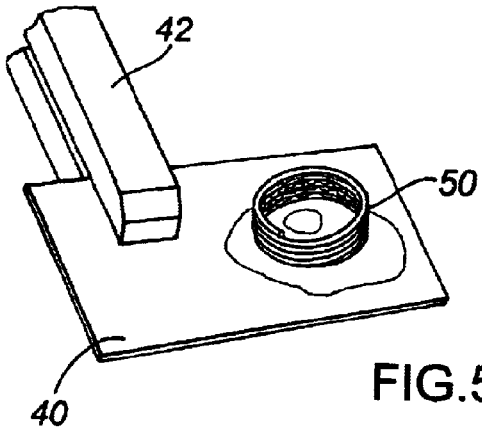

FIGS. 3 to 5 demonstrate flux distribution along the seam of flux-coated wire preforms made according to the invention. A copper coupon 40 is held in place by a clamping device 42 and suspended in the horizontal position. A flux-cored ring (preform 44 made from a length of seamed flux cored wire) is set upon the top surface of the copper coupon 40. Heat (from a propane, butane or similar torch) is applied to the bottom of the coupon.

When the flux-cored preform 44 reaches a temperature between 500 and 1100° F., flux can be seen dispersing from the wire seam uniformly along the full circumference of the preform 44 as shown in FIG. 4. Note the metal alloy strip is still in solid form, but the flux is being uniformly dispensed from the seam around the entire ring preform.

FIG. 5 shows a multi-turn helical loop preform 50 according to the invention, wherein the coupon 40 and the preform 50 are heated sufficient to cause molten flux material to disperse uniformly from a seam along the inner circumference of the preform, and [the] *then* evenly over the top surface of the coupon 40.

While there have been described what are at present considered to be the preferred embodiments of this invention, it will be obvious to those skilled in the art that various changes and modifications may be made [thin] without departing from the true spirit and scope of the invention defined by the following claims.

We claim:

[1. A wire preform suitable for use in brazing components to one another, comprising:

a length of wire having a core of a flux material, and a longitudinal seam or gap extending over the length of the wire wherein the seam is formed so that when heated, the flux material flows from the core and out of the seam of the wire; and the length of wire is in the form of a loop having a certain circumference so that when the preform is heated, flux material is dispersed uniformly from the circumference of the preform for evenly treating a component surface on which the preform is disposed.]

[2. A wire preform according to claim 1, wherein the length of wire is formed from an elongate metal sheet, and the seam of the wire is defined by an inner edge portion of the sheet and a confronting outer edge portion of the sheet.]

[3. A wire preform according to claim 2, wherein the inner edge portion of the metal sheet is angled to be embedded in the flux material.]

[4. A wire preform according to claim 1, wherein the seam on the length of wire is on the inner circumference of the preform.]

[5. A wire preform according to claim 1, wherein the length of wire is helical in form.]

[6. A wire preform according to claim 5, wherein the seam on the circumference of the preform.]

[7. A wire preform according to claim 1, wherein the wire has a diameter of between about 0.031 inch and 0.125 inch.]

[8. A wire preform according to claim 1, wherein the length of wire comprises a silver alloy.]

*9. A preform comprising:*

*a length of metal having a core of a flux material for joining components to one another, and a longitudinal gap extending over the length of the metal;*

*wherein the gap is formed to allow the flux material to evenly flow from the core and out of the gap of the metal; and*

*wherein the length of metal is formed into a ring, and the gap of the metal is defined by an inner circumference portion of the ring.*

*10. The preform of claim 9, wherein the preform may be at least one of: an oval, a square, a multi-form helical loop; a braze ring; a helical shape having a circular cross-section; and a wire having a diameter between about 0.031 and about 0.125 inches.*

*11. The preform of claim 9, wherein when the preform reaches a temperature between approximately 500 and approximately 1100 degrees F., flux is dispersed from the gap uniformly along a circumference of the preform.*

*12. The preform of claim 9, wherein the flux has a melting temperature of approximately 500 and approximately 1100 degrees F., and wherein the metal has a melting temperature at least above the melting temperature of the flux.*

*13. A material for joining components to one another comprising:*

*a length of metal formed into a U-shaped channel by a die;*

*a core of flux in the U-shaped channel created by passing the channel through a trough by pulling the length of metal in a direction away from a dispensing apparatus;*

*at least one wall of metal around the core; and*

*a path for the flux from the core to aid in release of the flux;*

*wherein the metal then passes through another die and is formed to its final size diameter, while maintaining the path;*

*wherein when the metal is heated, the flux is dispersed from the core to evenly treat a component surface;*

*wherein the flux has a melting temperature and the length of metal has a melting temperature at least above the melting temperature of the flux.*

*14. The material of claim 13, wherein the material is then packaged in spools.*

*15. The material of claim 13, wherein the metal is an alloy of at least one of the following: aluminum-silicon; zinc-aluminum; copper zinc; silver-copper-zinc; silver-copper-zinc-tin; silver copper-zinc-tin-nickel; silver-copper-zinc-nickel; silver-copper-tin; silver-copper-zinc-manganese-nickel; silver-copper-zinc-cadmium; and silver-copper-zinc-cadmium.*

*16. The material of claim 13, wherein the length of metal is a narrow elongate strip coiled onto a spool to facilitate feeding of the length of metal during a manufacturing process.*

*17. The material of claim 13, wherein the material is formed into a brazing wire having a size and a cross section of a desired shape and adopting a configuration that is complementary to various angles and sizes of surfaces to be brazed.*

*18. The material of claim 13, wherein the core has a cross-section in the shape of an oval.*

*19. The material of claim 13, wherein the core has a cross-section defined by at least first and second walls that are substantially perpendicular to one another.*

*20. The material of claim 19 wherein the core has a cross-section in the shape of a square.*

*21. The material of claim 13 is in the shape of a helical loop.*

*22. The material of claim 13 is formed into a braze ring preform.*

*23. The material of claim 13 wherein the core has a circular cross-section.*

*24. The material of claim 13 wherein the length of metal wrapped around the core has a diameter between about 0.031 and about 0.125 inches.*

*25. The material of claim 13 wherein a butt seam is formed between opposed ends of the length of metal, and wherein the path is defined at the butt seam.*

*26. The material of claim 13 arranged into a preform having an inner perimeter surface and an outer perimeter surface, wherein the butt seam is formed along the inner perimeter surface.*

*27. The material of claim 13 wherein the path is formed by overlapping portions of the metal.*

*28. The material of claim 13, wherein the metal's final size diameter includes a measurement of cross sectional width for any shape.*

*29. The material of claim 13, wherein the dies may include any manufacturing die, including roll forming dies.*

*30. A material for joining components to one another comprising:*

*a length of metal formed into a U-shaped channel by a die;*

*a core of flux in the U-shaped channel created by passing the channel through a trough by pulling the length of metal in a direction away from a dispensing apparatus;*

*at least one wall of metal around the core; and*

*a path for the flux from the core to aid in release of the flux;*

*wherein the metal then passes through another die and is formed to its final size and shape, while maintaining the path;*

*wherein when the metal is heated, the flux is dispersed from the core to evenly treat a component surface;*

*wherein the flux has a melting temperature and the length of metal has a melting temperature at least above the melting temperature of the flux.*

* * * * *